(12) United States Patent
Matza

(10) Patent No.: US 12,503,657 B2
(45) Date of Patent: *Dec. 23, 2025

(54) DECONTAMINATION OF SULFUR CONTAMINANTS FROM HYDROCARBONS

(71) Applicant: ZymeFlow, Inc., Houston, TX (US)

(72) Inventor: Stephen D. Matza, Sugarland, TX (US)

(73) Assignee: ZYMEFLOW, INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/774,699

(22) Filed: Jul. 16, 2024

(65) Prior Publication Data
US 2024/0368482 A1   Nov. 7, 2024

Related U.S. Application Data

(63) Continuation of application No. 17/899,462, filed on Aug. 30, 2022, now abandoned, which is a continuation of application No. 16/984,373, filed on Aug. 4, 2020, now Pat. No. 11,427,769, which is a continuation of application No. 16/128,272, filed on Sep. 11, 2018, now Pat. No. 10,731,089, which is a continuation of application No. 14/859,480, filed on Sep. 21, 2015, now Pat. No. 10,093,869.

(51) Int. Cl.
*C10G 29/20* (2006.01)
*E21B 43/00* (2006.01)

(52) U.S. Cl.
CPC .............. *C10G 29/20* (2013.01); *E21B 43/00* (2013.01)

(58) Field of Classification Search
CPC .......... C10G 29/20; E21B 43/00; E21B 43/34
See application file for complete search history.

(56) References Cited

U.S. PATENT DOCUMENTS

| | | | |
|---|---|---|---|
| 5,980,733 A * | 11/1999 | Collins ................. | C10G 29/20 208/348 |
| 8,993,488 B2 * | 3/2015 | Frost .................... | C10G 29/20 507/103 |
| 9,512,019 B2 * | 12/2016 | Matza .................. | C02F 1/68 |
| 9,815,720 B2 * | 11/2017 | Matza .................. | C02F 1/02 |
| 9,920,236 B2 * | 3/2018 | Matza .................. | C09K 8/52 |
| 10,052,583 B2 * | 8/2018 | Matza .................. | B01D 53/52 |
| 10,093,869 B2 * | 10/2018 | Matza .................. | C10G 29/20 |
| 10,526,527 B2 * | 1/2020 | Matza .................. | C10G 29/04 |
| 10,583,392 B2 * | 3/2020 | Matza .................. | C02F 1/72 |
| 10,731,089 B2 * | 8/2020 | Matza .................. | E21B 43/34 |
| 10,745,303 B2 * | 8/2020 | Matza .................. | C10G 29/04 |
| 10,960,348 B2 * | 3/2021 | Matza .................. | B01D 53/52 |
| 11,236,262 B2 * | 2/2022 | Matza .................. | C09K 8/52 |
| 11,427,769 B2 * | 8/2022 | Matza .................. | E21B 43/34 |
| 11,753,320 B2 * | 9/2023 | Matza .................. | C02F 1/02 210/763 |
| 11,850,551 B2 * | 12/2023 | Matza .................. | B01D 53/52 |
| 12,187,631 B2 * | 1/2025 | Matza .................. | C10G 29/04 |

(Continued)

*Primary Examiner* — Alicia Bland
(74) *Attorney, Agent, or Firm* — CONLEY ROSE, P.C.

(57) ABSTRACT

A method for removing hydrogen sulfide from a hydrocarbon. The method comprises introducing methylmorpholine-N-oxide to a vessel, wherein the vessel comprises the hydrocarbon, and wherein the hydrocarbon comprises hydrogen sulfide; and treating the hydrocarbon by allowing the methylmorpholine-N-oxide to react with the hydrogen sulfide.

19 Claims, 3 Drawing Sheets

(56) References Cited

U.S. PATENT DOCUMENTS

| | | | | |
|---|---|---|---|---|
| 2012/0220500 A1* | 8/2012 | Matza | ........................ | C09K 8/52 |
| | | | | 208/236 |
| 2013/0126444 A1* | 5/2013 | Matza | ........................ | C02F 1/38 |
| | | | | 210/763 |
| 2015/0027961 A1* | 1/2015 | Matza | ........................ | C02F 1/02 |
| | | | | 210/763 |
| 2015/0166877 A1* | 6/2015 | Matza | ..................... | C10G 27/04 |
| | | | | 166/305.1 |

* cited by examiner

DECONTAMINATION OF SULFUR CONTAMINANTS FROM HYDROCARBONS

CROSS-REFERENCE TO RELATED APPLICATIONS

This application is a continuation application of U.S. patent application Ser. No. 17/899,462 filed on Aug. 30, 2022, which is a continuation application of U.S. patent application Ser. No. 16/984,373 filed on Aug. 4, 2020 (now U.S. Pat. No. 11,427,769), which is a continuation application of U.S. patent application Ser. No. 16/128,272 filed on Sep. 11, 2018 (now U.S. Pat. No. 10,731,089), which is a continuation application of U.S. patent application Ser. No. 14/859,480 filed on Sep. 21, 20152018 (now U.S. Pat. No. 10,093,869), the entire disclosures of which are incorporated herein by reference.

BACKGROUND OF THE INVENTION

Field of the Invention

Methods and systems for the decontamination of sulfur contaminants from hydrocarbons are provided. Specifically, methods and systems are provided for using methylmorpholine-N-oxide to remove sulfur contaminants from hydrocarbons in both surface and downhole applications.

Background of the Invention

Sulfur contaminants, for example hydrogen sulfide ($H_2S$) can be produced by natural forces and as by-products of industrial processes. As a consequence of the offensive nature of, and potentially environmental and safety problems posed by sulfur contaminants, such as $H_2S$, the release to the atmosphere of some sulfur contaminants may be regulated by environmental agencies.

Certain sulfur contaminants, particularly hydrogen sulfide and mercaptan compounds, are known to occur with fluid hydrocarbons in subterranean formations, such as coal beds and those that contain oil and/or gas. It is, thus, well known that sulfur contaminants may be dissolved or dispersed in fluid hydrocarbons recovered from such formations and/or separately produced with such hydrocarbons in the gas phase. Regardless of the form of occurrence, and particularly in the case of high concentrations thereof, it has long been important that sulfur contaminants be handled and treated using methods designed to prevent their release, for example, as a gas, to the environment. For purposes of this disclosure, "hydrocarbons" are defined to mean hydrocarbons which occur in the liquid phase, such as crude oil, and also hydrocarbons which occur in the gas phase, such as natural gas. Distinction between the matter phase of the hydrocarbons may be made with reference to a hydrocarbon fluid or a hydrocarbon gas. Still further, a hydrocarbon containing a sulfur contaminant, such as hydrogen sulfide and/or mercaptans, is referred to herein as being "sour." For example, crude oil and natural gas recovered in a subterranean formation together with a sulfur contaminant may be referred to as "sour" crude and "sour" gas.

In addition to the natural occurrence of sulfur contaminants, such contaminants may also be produced in industrial operations and may result in contamination of refined hydrocarbon products, such as jet fuel, heating oil, petrochemical feedstocks and the like. Further, refineries and petrochemical plants are commonly contaminated with sulfur contaminants. These sulfur contaminants may typically be mitigated or removed as part of decontamination procedures, for instance, prior to vessel (e.g., large storage tanks) entry by individuals. A conventional approach to decontamination is to use hydrogen sulfide scavengers (e.g., liquid scavengers) such as triazine, acrolein, or formaldehyde. Such scavengers may rely on non-oxidative complexation and may be an economical approach for $H_2S$ decontamination. Liquid scavengers may tie up $H_2S$ as water-soluble compounds that may be discharged to wastewater treatment facilities. However, such scavengers have drawbacks. For instance, some of the reaction products may not be water-soluble, and some of the treatment chemicals may have associated toxicity or environmental restrictions in certain locations. In addition, some sulfur contaminants may only be removed by specific scavengers, for example, typically only acrolein may neutralize pyrophoric iron sulfides. Additionally, triazine treatments may raise the pH of effluent streams and as a result, may promote the formation of scales on metal surfaces. Formaldehyde reactions with $H_2S$ typically produce water insoluble products. Further, acrolein's benefits may be tempered by its toxicity.

Other methods have been developed and demonstrated to be effective at oxidizing and eliminating sulfur contaminants. Such methods include using permanganate (e.g., potassium permanganate), persulfate, sodium nitrite, ozone, hypochlorite, adducts of peroxide such as perborates and percarbonates, and long-chain amine oxides. The oxidizing chemicals may irreversibly convert sulfur contaminants (e.g., $H_2S$) to harmless water soluble forms of sulfur, which may be compatible with effluent discharge. Each of these oxidizing compounds (i.e., oxidizing chemicals) have certain drawbacks. Hypochlorite may form dangerous chlorine compounds. Ozone and permanganate may require field mixing. Permanganate decontaminations may be further complicated by large amounts of reaction solids that are typically processed at additional cost. Percarbonates, as with permanganate, may also be exothermic in their reaction, which may be particularly dangerous since the hydrocarbons may combust. Further, if using treatments comprising strong oxidizers (i.e., permanganate, percarbonate, persulfate) with large exotherms, operations may typically be accomplished in small sequential batches outside the storage vessel in order to control the associated exotherm. As a result, these treatments may involve considerable time and therefore cost. Further, such action may render downhole treatment of hydrocarbons an impossibility. Additionally, the strong oxidizers may also be corrosive. Moreover, some of these compounds may also react violently with hydrocarbon components that may be present in sour sludge. For example, the strong oxidizers may be non-selective in their reaction and may react with many of the hydrocarbon components in which decontamination is desired.

Mild oxidizers such as amine oxides and nitrites may be effective at oxidizing sulfur contaminants to harmless forms of sulfur while having limited to no effect on hydrocarbons, unlike the strong oxidizers discussed above. Additionally, mild oxidizers may be added directly to a vessel or used downhole as their associated reactions may be non-exothermic. However, mild oxidizers also have drawbacks. For instance, typical long-chain amine oxides may pose foaming issues due to their surfactant nature. These amine oxides may also have limited efficiency for large amounts of $H_2S$, since they are typically diluted in water to prevent gel formation. Further, some of the mild oxidizers may impart additional nitrogen to the hydrocarbons which may poison some downstream catalysts used during refining of the hydrocarbons. Nitrites may also have drawbacks, as their reaction with hydrogen sulfide produces ammonia. As a result, the nitrite oxidation reaction may be accompanied by a rise in pH, which at some point may cease the oxidation before it is complete.

Consequently, there is a need for improved methods and systems for decontaminating hydrocarbons contaminated with sulfur contaminants.

BRIEF SUMMARY OF SOME OF THE PREFERRED EMBODIMENTS

These and other needs in the art are addressed in one embodiment by a method for removing hydrogen sulfide from a hydrocarbon. The method comprises introducing methylmorpholine-N-oxide to a vessel, wherein the vessel comprises the hydrocarbon, and wherein the hydrocarbon comprises hydrogen sulfide; and treating the hydrocarbon by allowing the methylmorpholine-N-oxide to react with the hydrogen sulfide.

These and other needs in the art are addressed in another embodiment by a method for removing hydrogen sulfide from a hydrocarbon. The method comprises introducing methylmorpholine-N-oxide into wellhead equipment, wherein the hydrocarbon comprises hydrogen sulfide, and wherein the hydrocarbon is disposed within or about the wellhead equipment; allowing the methylmorpholine-N-oxide to contact the hydrocarbon; and treating the hydrocarbon by allowing the methylmorpholine-N-oxide to react with the hydrogen sulfide.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments, reference will now be made to the accompanying drawings in which.

DETAILED DESCRIPTION OF THE PREFERRED EMBODIMENTS

Figure 1:
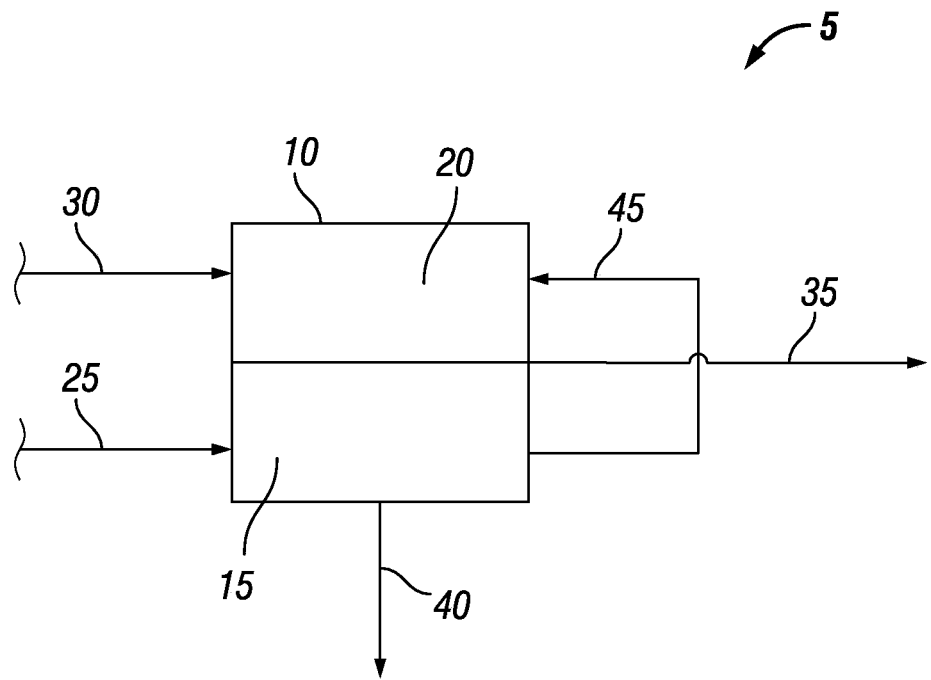
FIG. 1 illustrates an embodiment of a methylmorpholine-N-oxide hydrocarbon treatment method.

FIG. 1 illustrates an embodiment of methylmorpholine-N-oxide hydrocarbon treatment method 5. In an embodiment, methylmorpholine-N-oxide hydrocarbon treatment method 5 treats a vessel containing at least one hydrocarbon contaminated with a sulfur contaminant. The hydrocarbon may be multiphase, i.e., the hydrocarbon may be a hydrocarbon fluid and/or a hydrocarbon gas. In multiphase embodiments, one or more phases of the hydrocarbon may be contaminated with the sulfur contaminants. In some embodiments, decontamination of the hydrocarbon comprises removing a portion or all of the sulfur contaminants from the hydrocarbon.

In embodiments as shown in FIG. 1, a hydrocarbon contaminated with a sulfur contaminant (e.g., sour crude and/or sour gas) may be disposed within vessel 10 (e.g., a crude oil tank). As used herein, "contaminated" refers to a hydrocarbon contaminated with sulfur contaminants. It is to be understood that "contaminated" does not exclude hydrocarbons contaminated with other types of contaminants in addition to the sulfur contaminants. Vessel 10 may include any type of vessel that may contain a hydrocarbon regardless of the phase of matter of the hydrocarbon. In an embodiment, vessel 10 is a crude oil tank. In some embodiments, vessel 10 comprises a hydrocarbon fluid layer 15 and a hydrocarbon gas layer 20. In embodiments, one or both of the hydrocarbon fluid layer 15 and the hydrocarbon gas layer 20 are contaminated with sulfur contaminants. Without limitation, examples of sulfur contaminants include hydrogen sulfide, iron sulfides, mercaptans, or any combinations thereof. In an embodiment, the sulfur contaminant comprises hydrogen sulfide. In some embodiments, the iron sulfides comprise pyrophoric iron sulfides. The pyrophoric iron sulfides may include any pyrophoric iron sulfides. In embodiments, the pyrophoric iron sulfides comprise pyrite, troilite, marcasite, pyrrhotite, or any combination thereof. The hydrocarbon fluid layer 15 may comprise water. The hydrocarbon fluid layer 15 may comprise a water-in-oil emulsion. The hydrocarbon gas layer 20 may comprise water vapor. The hydrocarbon gas layer 20 may comprise air.

The hydrocarbon fluid layer 15 and the hydrocarbon gas layer 20 may be contaminated with the sulfur contaminants by any method of contamination. The sulfur contaminants may be provided to the hydrocarbon fluid layer 15 and the hydrocarbon gas layer 20 from any source. The hydrocarbon fluid layer 15 and the hydrocarbon gas layer 20 may inherently comprise the sulfur contaminants or may be contaminated by sulfur contaminants within a subterranean formation during any phase of production or operation related to production. The hydrocarbon fluid layer 15 and the hydrocarbon gas layer 20 may be contaminated during refinement or during any other industrial application. The sulfur contaminants may be present in the hydrocarbon fluid layer 15 and the hydrocarbon gas layer 20 at any concentration. Without limitation, the sulfur contaminants may be present in the hydrocarbon fluid layer 15 and/or the hydrocarbon gas layer 20 in an amount in a range including any of and between any of about 100 ppm to about 180,000 ppm. For example, the sulfur contaminants may be present in the hydrocarbon fluid layer 15 and the hydrocarbon gas layer 20 in an amount of about 100 ppm, about 500 ppm, about 1000 ppm, about 5000 ppm, about 10,000 ppm, about 15,000 ppm, about 50,000 ppm, about 100,000 ppm, about 150,000 ppm, about 180,000 ppm, or any ranges therebetween.

FIG. 1 shows an embodiment of a methylmorpholine-N-oxide hydrocarbon treatment method 5 in which methylmorpholine-N-oxide 25 is introduced to vessel 10. In the embodiment illustrated by FIG. 1, methylmorpholine-N-oxide 25 is introduced to the hydrocarbon fluid layer 15 disposed within vessel 10. Methylmorpholine-N-oxide 25 may be introduced to vessel 10 by any suitable means.

Without limitation, examples of such suitable means include a drum pump, tank truck, and the like. Methylmorpholine-N-oxide 25 may be introduced in any suitable form for removing the sulfur contaminants from the hydrocarbon fluid layer 15. In some embodiments, methylmorpholine-N-oxide 25 is in a methylmorpholine-N-oxide solution comprising the methylmorpholine-N-oxide 25 and a carrier fluid (e.g., a hydrocarbon, water, etc.). The methylmorpholine-N-oxide solution may have the methylmorpholine-N-oxide 25 in any desired amount. In some embodiments, the methylmorpholine-N-oxide 25 may be in a very concentrated form in the methylmorpholine-N-oxide solution. Without being limited by theory, such very concentrated form may allow the methylmorpholine-N-oxide 25 to be applied in small, efficient amounts. The concentrated form may include any desirable concentration. In an embodiment, the concentration of the methylmorpholine-N-oxide 25 in the hydrocarbon fluid layer 15 is between about 0.01 weight volume % and about 60 weight volume %, alternatively between about 10 weight volume % and about 20 weight volume %, further alternatively between about 5 weight volume % and about 60 weight volume %, and alternatively between about 50 weight volume % and about 60 weight volume %. In embodiments, the concentration of methylmorpholine-N-oxide 25 in the hydrocarbon fluid layer 15 may be any individual weight volume % in the above ranges or any smaller range of weight volume % that is included in the above ranges. In an embodiment, the concentration of methylmorpholine-N-oxide 25 in the hydrocarbon fluid layer 15 is between about 0.01 weight volume % and about 10 weight volume %. In an embodiment, the methylmorpholine-N-oxide 25 is a short-chain amine oxide. In embodiments, the methylmorpholine-N-oxide 25 has the molecular formula $C_5H_{11}NO_2$. In vessel 10, methylmorpholine-N-oxide 25 contacts the hydrocarbon fluid layer 15 comprising the sulfur contaminants. In some embodiments, methylmorpholine-N-oxide 25 is not heated before introduction to vessel 10. In alternative embodiments, methylmorpholine-N-oxide 25 is heated before introduction to vessel 10. In embodiments, the amount of methylmorpholine-N-oxide 25 added to vessel 10 provides a mole ratio of methylmorpholine-N-oxide:a sulfur contaminant in the hydrocarbon fluid layer 15 of from about 1.0 mole methylmorpholine-N-oxide:1.0 mole of a sulfur contaminant to about 3.0 mole methylmorpholine-N-oxide:1.0 mole of a sulfur contaminant, or any range or mole ratio therebetween.

In the embodiments shown in FIG. 1, steam 30 may also be added to vessel 10. Steam 30 may be added to increase the temperature of the hydrocarbon fluid layer 15 and/or the hydrocarbon gas layer 20 disposed within vessel 10. In some embodiments, steam 30 may be added to vessel 10 in amounts as desired. In some embodiments, steam 30 may be added in a continuous manner. Without limitation, steam 30 may be added to increase the temperature of the hydrocarbon fluid layer 15 and/or the hydrocarbon gas layer 20 to a temperature from about 70° F. to about 250° F., alternatively, from about 75° F. to about 125° F., from about 120° F. to about 250° F., from about 150° F. to about 235° F., or further alternatively, from about 200° F. to about 250° F. In embodiments, the temperature may be any individual temperature in the above ranges or any smaller range of temperatures that is included in the above ranges. Any suitable psig steam 30 may be used. In embodiments, the steam 30 is 150 psig or less. In an embodiment, the steam 30 is 50 psig. In an embodiment, the steam 30 is 150 psig.

With continued reference to FIG. 1, as the methylmorpholine-N-oxide 25 reacts with and removes the sulfur contaminants in the hydrocarbon fluid layer 15, the concentration gradient of the sulfur contaminants in the hydrocarbon fluid layer 15 may decrease, and the capacity of the hydrocarbon fluid layer 15 to dissolve more of the sulfur contaminants may be increased. Any sulfur contaminants that may have been present in the hydrocarbon gas layer 20 or any sulfur contaminants that may have evaporated into the hydrocarbon gas layer 20 after a heat transfer initiated by the application of the steam 30 may contact the interface between the hydrocarbon fluid layer 15 and the hydrocarbon gas layer 20 and may condense into the hydrocarbon fluid layer 15. The rate at which the sulfur contaminants condense into the hydrocarbon fluid layer 15 may be determined by the temperature, pressure, and the concentration gradient of the sulfur contaminants in the hydrocarbon fluid layer 15. The methylmorpholine-N-oxide 25 may then act to remove the sulfur contaminants that have condensed into the hydrocarbon fluid layer 15 from the hydrocarbon gas layer 20, thus decontaminating both the hydrocarbon fluid layer 15 and the hydrocarbon gas layer 20. The rate of condensation may be adjusted by reducing the temperature of the system, increasing the pressure of the system, increasing the surface area of the interface between the hydrocarbon fluid layer 15 and the hydrocarbon gas layer 20, or any other suitable means for condensing the sulfur contaminants into the hydrocarbon fluid layer 15.

Figure 2:
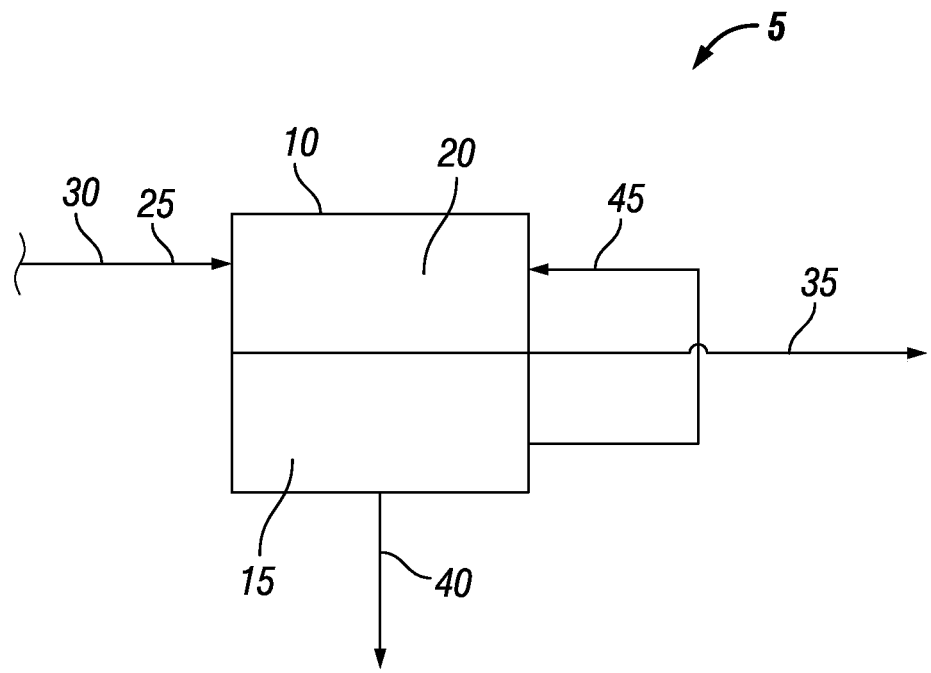
FIG. 2 illustrates another embodiment of a methylmorpholine-N-oxide hydrocarbon treatment method.

FIG. 2 illustrates another embodiment of methylmorpholine-N-oxide hydrocarbon treatment method 5. As with FIG. 1, methylmorpholine-N-oxide hydrocarbon treatment method 5 treats a vessel 10 comprising a hydrocarbon fluid layer 15 and a hydrocarbon gas layer 20 contaminated with sulfur contaminants by decontaminating the hydrocarbon fluid layer 15 and the hydrocarbon gas layer 20 by removing a portion or all of the sulfur contaminants from the hydrocarbon fluid layer 15 and the hydrocarbon gas layer 20. However, FIG. 2 shows an embodiment of methylmorpholine-N-oxide water treatment system 5 in which methylmorpholine-N-oxide 25 is introduced to vessel 10 in the hydrocarbon gas layer 20. In the embodiment illustrated by FIG. 2, methylmorpholine-N-oxide 25 may be introduced to the hydrocarbon gas layer 20 disposed within vessel 10 by any suitable means. Without limitation, examples of such suitable means include a drum pump, tank truck, and the like. As in FIG. 1, steam 30 may be added to vessel 10 to increase the temperature of the hydrocarbon gas layer 20. In the embodiments of FIG. 2, the methylmorpholine-N-oxide 25 may be added to steam 30 prior to injection into vessel 10. Methylmorpholine-N-oxide 25 may be added to steam 30 by any suitable means as would be understood by one of ordinary skill in the art. Once the methylmorpholine-N-oxide 25 has been injected into steam 30, the mixture of the methylmorpholine-N-oxide 25 and steam 30 may be injected into the hydrocarbon gas layer 20 as illustrated by FIG. 2. In some embodiments, the mixture of the steam 30 and the methylmorpholine-N-oxide 25 may be injected into the hydrocarbon gas layer 20 at a rate between about thirty gallons per hour to about three hundred gallons per hour. For example, the mixture of the steam 30 and the methylmorpholine-N-oxide 25 may be injected into the hydrocarbon gas layer 20 at a rate of about thirty gallons per hour, forty gallons per hour, fifty gallons per hour, eighty gallons per hour, one hundred gallons per hour, one hundred and fifty gallons per hour, two hundred gallons per hour, two hundred and fifty gallons per hour, or about three hundred gallons per hour; and encompassing any rate in between the disclosed values. For the embodiment described by FIG. 2, the temperature of the hydrocarbon gas layer 20 may be higher than the boiling point of the methylmorpholine-N-oxide 25 so as to maintain the methylmorpholine-N-oxide in the gas phase. Specifically, the temperature of the hydrocarbon gas layer 20 may be above 234° F. In alternative embodiments (not shown), the methylmorpholine-N-oxide 25 may be added separate from steam 30. Further alternatively, if desired, the temperature of the hydrocarbon gas layer 20 may be reduced to below the boiling point of the methylmorpholine-N-oxide 25, and the methylmorpholine-N-oxide 25 may condense into the hydrocarbon fluid layer 15. The methylmorpholine-N-oxide 25 may be introduced into the hydrocarbon gas layer 20 in any desired amount. In some embodiments, the methylmorpholine-N-oxide 25 may be in a very concentrated form in the hydrocarbon gas layer 20. In an embodiment, the concentration of methylmorpholine-N-oxide 25 in the hydrocarbon gas layer 20 is between about 0.01 weight volume % and about 60 weight volume %, alternatively between about 10 weight volume % and about 20 weight volume %, further alternatively between about 5 weight volume % and about 60 weight volume %, and alternatively between about 50 weight volume % and about 60 weight volume %. In embodiments, the concentration of methylmorpholine-N-oxide 25 in the hydrocarbon gas layer 20 may be any individual weight volume % in the above ranges or any smaller range of weight volume % that is included in the above ranges. In an embodiment, the concentration of methylmorpholine-N-oxide 25 in the hydrocarbon gas layer 20 is between about 0.01 weight volume % and about 10 weight volume %. In embodiments, the amount of methylmorpholine-N-oxide 25 added to vessel 10 provides a mole ratio of methylmorpholine-N-oxide:a sulfur contaminant in the hydrocarbon gas layer 20 disposed within vessel 10 from about 1.0 mole methylmorpholine-N-oxide:1.0 mole of a sulfur contaminant to about 3.0 mole methylmorpholine-N-oxide:1.0 mole of a sulfur contaminant, or any range or mole ratio therebetween.

As with FIG. 1, steam 30 may also be added to vessel 10 in the embodiment illustrated by FIG. 2. Without limitation, steam 15 may be added to increase the temperature of the hydrocarbon fluid layer 15 and/or the hydrocarbon gas layer 20 to a temperature from about 70° F. to about 250° F., alternatively, from about 75° F. to about 125° F., from about 120° F. to about 250° F., from about 150° F. to about 235° F., or further alternatively, from about 200° F. to about 250° F. In embodiments, the temperature may be any individual temperature in the above ranges or any smaller range of temperatures that is included in the above ranges. Any suitable psig steam 30 may be used. In embodiments, the steam 30 is 150 psig or less. In an embodiment, the steam 30 is 50 psig. In an embodiment, the steam 30 is 150 psig.

With continued reference to FIG. 2, as the methylmorpholine-N-oxide 25 reacts with and removes the sulfur contaminants in the hydrocarbon gas layer 20, the concentration gradient of the sulfur contaminants in the hydrocarbon gas layer 20 may decrease. Any sulfur contaminants that may have been present in the hydrocarbon fluid layer 15 may evaporate into the hydrocarbon gas layer 20 after a heat transfer initiated by the application of the steam 30. The rate at which the sulfur contaminants evaporate into the hydrocarbon gas layer 20 may be determined by the temperature, pressure, and the concentration gradient of the sulfur contaminants in the hydrocarbon gas layer 20. The methylmorpholine-N-oxide 25 may then act to remove the sulfur contaminants that have evaporated into the hydrocarbon gas layer 20 from the hydrocarbon fluid layer 15, thus decontaminating both the hydrocarbon gas layer 20 and the hydrocarbon fluid layer 15. The rate of evaporation may be adjusted by increasing the temperature of the system, reducing the pressure of the system, increasing the surface area of the interface between the hydrocarbon fluid layer 15 and the hydrocarbon gas layer 20, or any other suitable means for evaporating the sulfur contaminants into the hydrocarbon gas layer 20.

With reference to FIGS. 1 and 2, in optional embodiments, the methylmorpholine-N-oxide 25 may react with the sulfur contaminants in the presence of iron oxide (e.g., rust). Without limitation by theory, the presence of iron oxide catalyzes the methylmorpholine-N-oxide 25 to convert the sulfur contaminants to elemental sulfur and thiosulfate reaction products irreversibly. Any suitable iron oxide may be used. In embodiments, the iron oxide includes hydrated iron oxide, anhydrous iron oxide, or any combination thereof. In an embodiment, the iron oxide is hydrous iron oxide. In embodiments, the iron oxide includes ferrous or ferric oxides that are hydrated. In an embodiment, the iron oxide is $Fe_2O_3 \cdot 7H_2O$, $Fe_2O_3 \cdot 10H_2O$, or any combination thereof. The iron oxide may be present in vessel 10 in any amount suitable to catalyze the reaction between the methylmorpholine-N-oxide 25 oxide and the contaminants. In an embodiment, vessel 10 has iron oxide in the hydrocarbon fluid layer 15 in an amount from about 100 ppm iron oxide to about 1,000 ppm iron oxide. In embodiments, the iron oxide may be present in any individual amount in the above range or any smaller range of amounts that is included in the above range. In embodiments, no iron oxide is added to vessel 10 as methylmorpholine-N-oxide hydrocarbon treatment method 5 uses the iron oxide already present in vessel 10. In other embodiments, iron oxide is added to vessel 10. Without limitation by theory, the reaction to remove the sulfur contaminants from the hydrocarbon fluid layer 15 and the hydrocarbon gas layer 20 may comprise the methylmorpholine-N-oxide, steam, and iron oxide.

Figure 3:
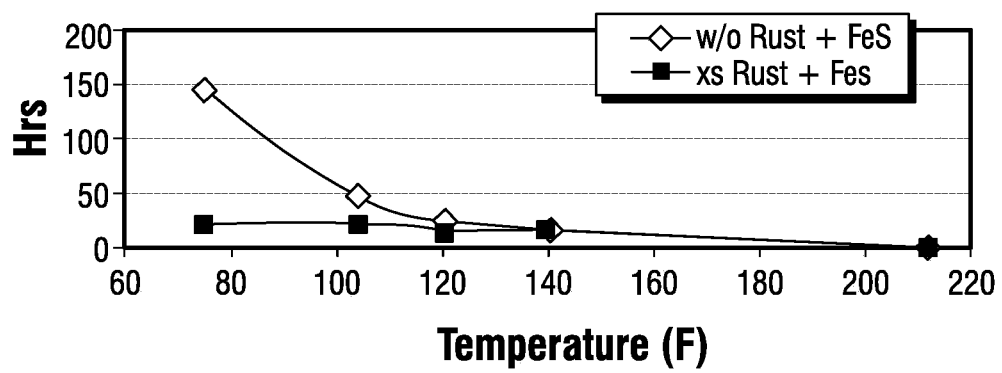
FIG. 3 illustrates reaction time versus temperature of a reaction methylmorpholine-N-oxide and $H_2S$.

The reaction may be allowed to occur for a sufficient time to allow the sulfur contaminants to be removed (i.e., converted) from the hydrocarbon fluid layer 15 and/or the hydrocarbon gas layer 20. In embodiments, the reaction is allowed to occur from about one hour to about fifty hours, alternatively from about one hour to about twenty-five hours. In embodiments, the reaction time may be any individual time in the above times or any smaller time ranges that are included in the above ranges. FIG. 3 illustrates examples of reaction time versus temperature. Without limitation by theory, it is to be understood that the higher the temperature, the less reaction time may be used. In embodiments, the reaction is allowed to occur for a sufficient time to substantially remove all of the sulfur contaminants (i.e., convert substantially all of the reactive sulfide to elemental sulfur). In some embodiments, the reaction produces substantially no foaming. And, in some embodiments, the reaction also may not generate ammonia. In other embodiments, the methylmorpholine-N-oxide 25 may impart nitrogen equally among the hydrocarbon and water phases, thereby reducing the poisoning of catalysts in downstream refining operations. In an embodiment, the reaction is non-exothermic. In other embodiments, surfactants are not added to the hydrocarbons or methylmorpholine-N-oxide 25. In some embodiments (e.g., the embodiment described by FIG. 1), if sufficient iron oxide is present, a suitable reaction time for an application may be obtained without the use of steam 30. Thus, for some embodiments (not illustrated), steam is not added to vessel 10.

After the desired reaction time occurs (i.e., sulfide conversion is about complete), the treated hydrocarbons 35 (i.e., a treated hydrocarbon fluid and/or hydrocarbon gas) may be drawn off from vessel 10 and nonhazardous products 40 may also be removed from vessel 10. Treated hydrocarbons 35 may be sent to any desired location such as a refinery. In embodiments, treated hydrocarbons 35 have no sulfur contaminants. Nonhazardous products 40 include nonhazardous sulfur reaction products along with other native solids in vessel 10 (e.g., sludge). Nonhazardous products 40 may be removed from vessel 10 by any suitable means. In an embodiment, the means include a centrifuge. In embodiments, the liquid portion of the effluent passing from the centrifuge may then be routed to a treatment facility or any other desirable location.

In the embodiments shown in FIGS. 1 and 2, methylmorpholine-N-oxide hydrocarbon treatment method 5 may also include re-circulation 45. Re-circulation 45 is the re-circulation of the hydrocarbon fluid layer 15. In some embodiments, hydrocarbon fluid layer 15 containing methylmorpholine-N-oxide 25 is re-circulated. Without limitation, re-circulation 45 facilitates distribution of methylmorpholine-N-oxide 25 in the hydrocarbon fluid layer 15. In an embodiment, from about one volume of the total amount of hydrocarbon fluid layer 15 in vessel 10 to about ten volumes of the total amount of hydrocarbon fluid layer 15 in vessel 10 may be re-circulated. In embodiments, re-circulation 45 may include re-circulation of any volume of hydrocarbon fluid layer 15 or range of volumes equal to or less than ten.

Figure 4:
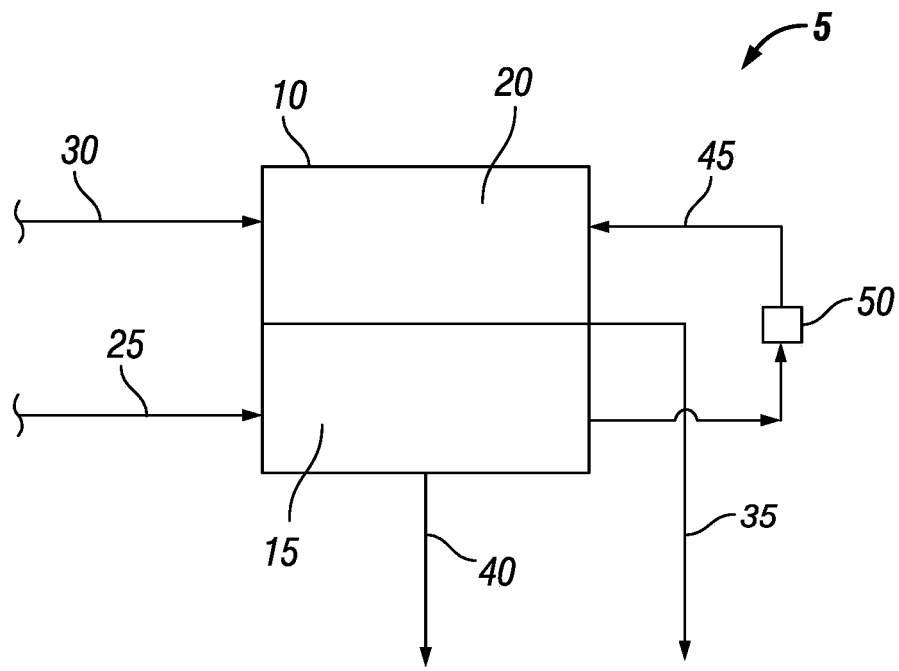
FIG. 4 illustrates an embodiment of a methylmorpholine-N-oxide hydrocarbon treatment method having a heat exchanger and re-circulation.

In embodiments as shown in FIG. 4, methylmorpholine-N-oxide hydrocarbon treatment method 5 includes heat exchanger 50, which adds heat to re-circulation 45. Without limitation, adding heat may increase the reaction rate.

It is to be understood that the embodiments of FIGS. 1, 2, and 4 depict a generalized schematic of a system for the decontamination of a hydrocarbon in a vessel 10. One or more components may be added or removed as would be apparent to one of ordinary skill in the art. Further, other components may be substituted for suitable alternatives as would be apparent to one of ordinary skill in the art.

Figure 5:
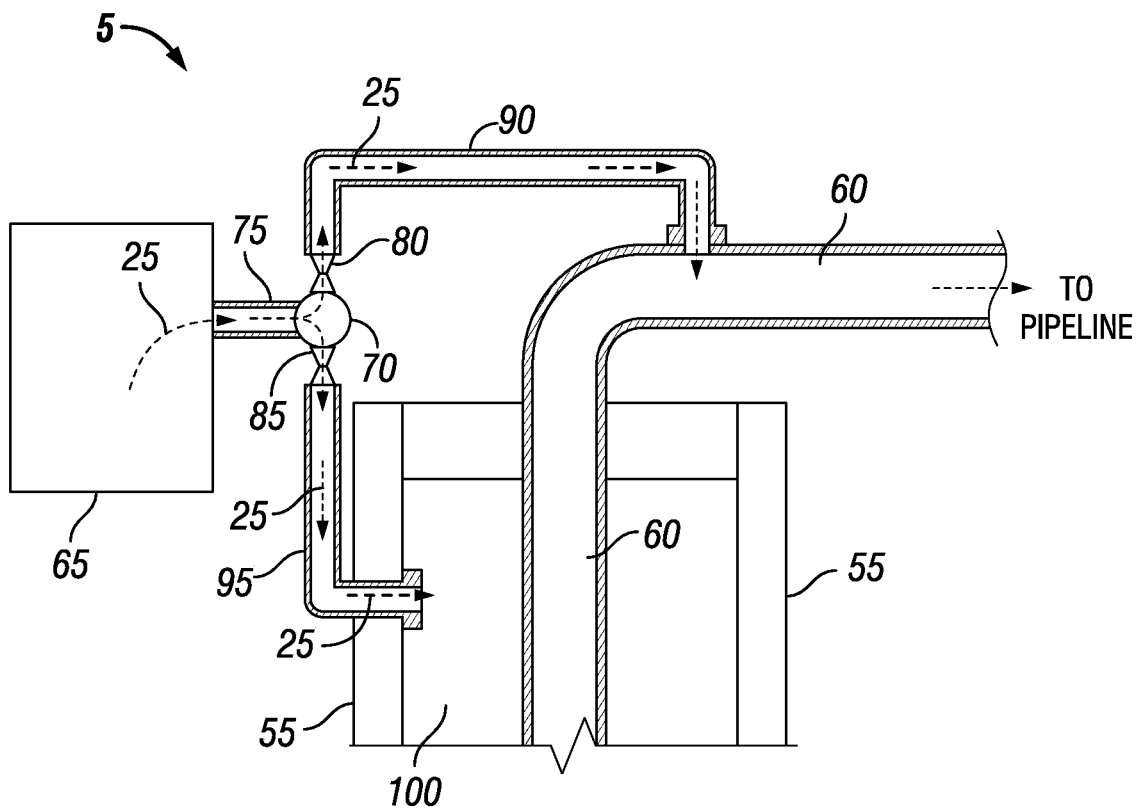
FIG. 5 illustrates an embodiment of a methylmorpholine-N-oxide hydrocarbon treatment method at the wellhead.

FIG. 5 illustrates another embodiment of a methylmorpholine-N-oxide hydrocarbon treatment method 5. FIG. 5 illustrates a well having an outer casing 55 and a fluid and/or gas conduit 60, which is disposed within the outer casing 55 and extends upwardly through the wellhead. In some embodiments, conduit 60 may be connected to a pipeline for transport of a fluid and/or a gas. In the embodiment of FIG. 5, the methylmorpholine-N-oxide 25 may be added to the sour crude and/or sour gas directly at the wellhead. The methylmorpholine-N-oxide 25 may be contained within a methylmorpholine-N-oxide storage tank 65. The methylmorpholine-N-oxide storage tank 65 is coupled to the suction side of pump 70 by tubing 75. In the embodiment of FIG. 5, pump 70 comprises two discharge sides regulated by vales 80 and 85, which couple pump 70 to tubing 90 and 95, respectively. Tubing 90 is also connected to conduit 60, whereas tubing 95 is connected to outer casing 55 in such a manner where a fluid (i.e., the methylmorpholine-N-oxide 25) may flow through outer casing 55.

When removal of sulfur contaminants is desired, methylmorpholine-N-oxide 25 may be pumped via pump 70 out of methylmorpholine-N-oxide storage tank 65. As discussed above, valves 80 and 85 regulate the discharge of methylmorpholine-N-oxide 25 from pump 70. When valve 80 is open and valve 85 is closed, the methylmorpholine-N-oxide 25 may be pumped through tubing 90 and into conduit 60 where it may contact sour crude or sour gas disposed within conduit 60. The circulation of the sour crude and/or sour gas within conduit 60 may cause the methylmorpholine-N-oxide 25 to mix with the sour crude and/or sour gas. Alternatively, if valve 80 is closed and valve 85 is open, the methylmorpholine-N-oxide 25 may be transported through outer casing 55, where it may be sprayed, dripped, or otherwise flow into the annular space 100 between the outer casing 55 and conduit 60. The methylmorpholine-N-oxide 25 may flow downwardly along the inner wall of outer casing 55 and also may flow along the outer wall of conduit 60. The methylmorpholine-N-oxide 25 may contact and, in some embodiments, may mix with the sour crude and/or sour gas disposed within or about the wellhead equipment.

The methylmorpholine-N-oxide 25 may react with the sulfur contaminants in the sour crude and/or sour gas, converting the sulfur contaminants to elemental sulfur or other nonhazardous products (e.g., nonhazardous products 40 in FIGS. 1, 2, and 4) and removed from the treated hydrocarbon if desired.

As the sour crude and/or sour gas is decontaminated, other decontamination equipment and/or techniques that may normally be desired to reduce the sulfur contaminants to an acceptable level may no longer be used. Further, by eliminating the sulfur contaminants in the sour crude and/or sour gas, the possibility of sulfur contaminants attacking the metal components of the well, the pipeline, or storage tanks is eliminated. Therefore, well expenses may be reduced and the useful life of well equipment may be extended.

In additional embodiments, not shown, heat may be introduced to conduit 60 or any other piece of wellhead equipment. The heat may be provided via any suitable mechanism including the injection of steam, or by using conduits with heating mechanisms installed such as electric heating systems used in downhole conduits to prevent bitumen from hardening, or electric heating systems which may be clamped onto the conduit. In some embodiments comprising steam, the steam may further comprise methylmorpholine-N-oxide 25. Any suitable psig steam may be used. In embodiments, the steam is 150 psig or less. In an embodiment, the steam is 50 psig. In an embodiment, the steam is 150 psig.

It is to be understood that the embodiment of FIG. 5 depicts a generalized schematic of a system for the decontamination of a hydrocarbon at the wellhead. One or more components may be added or removed as would be apparent to one of ordinary skill in the art. Further, other components may be substituted for suitable alternatives as would be apparent to one of ordinary skill in the art.

To further illustrate various illustrative embodiments of the present invention, the following examples are provided.

EXAMPLES

Example 1

A sample of sour crude was prepared by mixing 1 mL of sour water comprising 3.9% $H_2S$ with 27 mL of sweet crude oil to produce a contaminated sample with an $H_2S$ concentration measured at 1,444 ppm. The sample was shaken until it had reached equilibrium. After shaking, the sample was treated with 1 mL of methylmorpholine-N-oxide added directly to the top of the contaminated sample. The methylmorpholine-N-oxide was provided at a 3:1 mole ratio with the $H_2S$. A control sample was prepared under identical conditions except that it excluded treatment with the methylmorpholine-N-oxide. The control sample had a $H_2S$ concentration of 1,444 ppm. Both the experimental and control samples were heated in a water bath with a temperature of about 50° C. Elemental sulfur was observed in the experimental sample at 17 hours. At 24 hours, the water phases of both the control and experimental samples were removed and the $H_2S$ concentration measured using CHEMETS® colorimetric sulfide kits and lead acetate strips. CHEMETS® is a registered trademark of Chemetrics, Inc. of West Virginia. The control sample had an $H_2S$ concentration of greater than 600 ppm. The experimental sample had an $H_2S$ concentration of 0 ppm. The decrease of $H_2S$ in the control sample indicates that vapor losses of $H_2S$ compete with the methylmorpholine-N-oxide for treatment of a fluid hydrocarbon. This may be more apparent due to the low experimental temperature of the experiment which may extend reaction times. An increased temperature as may be generated by steam or by reaction within a subterranean formation may decrease the reaction time and increase the amount of $H_2S$ converted relative to the expected rate of vaporization of the $H_2S$. Further, the methylmorpholine-N-oxide has the potential, if desired, to be used in the vapor phase itself where it may contact and react with gaseous sulfur contaminants such as vaporized $H_2S$.

Example 2

A second experiment was performed to examine the decontamination reaction of methylmorpholine-N-oxide and $H_2S$ under conditions with less mixing than the amount used in Example 1 and additional time for the sample to remain static. The control and experimental component concentrations were prepared identical to those used in Example 1, the samples were allowed to stand for 24 hours with only occasional shaking. Separate oil and water phases were observed within a half hour of each time the samples were shook. After the 24 hour period, 1 mL of methylmorpholine-N-oxide was added directly to the top of the contaminated experimental sample. No shaking or vial inversion was used. The methylmorpholine-N-oxide was provided at a 3:1 mole ratio with the $H_2S$. Both the experimental and control samples were heated in a water bath with a temperature of about 50° C. Elemental sulfur was observed in the experimental sample at 20 hours. At 24 hours, the water phases of both the control and experimental samples were removed and the $H_2S$ concentration measured using CHEMETS® colorimetric sulfide kits and lead acetate strips. The control sample had an $H_2S$ concentration of greater than 600 ppm. The experimental sample had an $H_2S$ concentration of 0 ppm. The second experiment indicates that methylmorpholine-N-oxide added directly atop the oil phase without mixing is able to traverse the oil phase and react with $H_2S$. Further, the results indicate that for the treatment of hydrocarbons in static conditions, such as a subterranean reservoir, the methylmorpholine-N-oxide may be used to decontaminate the hydrocarbons. The results may be improved in deeper reservoirs as the geothermal gradient is generally accepted as a 1.4° F. increase per 100 feet of depth.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for treating sulfur contaminants, the method comprising:
    (A) introducing a short-chain amine oxide to a vessel, wherein the vessel comprises a hydrocarbon, wherein the sulfur contaminants are present in the hydrocarbon, wherein the sulfur contaminants comprise at least 1000 ppm of hydrogen sulfide;
    (B) allowing the short-chain amine oxide to react with the sulfur contaminant to convert the sulfur contaminant to elemental sulfur;
    (C) recirculating between about one volume of the hydrocarbon comprising the short-chain amine oxide in the vessel to about ten volumes of the hydrocarbon comprising the short-chain amine oxide in the vessel;
    (D) removing the elemental sulfur from the vessel, wherein the elemental sulfur is present in a treated hydrocarbon; and
    (E) separating the elemental sulfur from the treated hydrocarbon.

2. The method of claim 1, wherein the short-chain amine oxide comprises at least 2 and not more than 10 carbons.

3. The method of claim 1, wherein the short-chain amine oxide comprises at least 2 and not more than 8 carbons.

4. The method of claim 1, wherein the short-chain amine oxide comprises at least 3 and not more than 7 carbons.

5. The method of claim 1, wherein the short-chain amine oxide is a heterocyclic amine oxide.

6. The method of claim 1, wherein the short-chain amine oxide comprises methylmorpholine-N-oxide.

7. The method of claim 1, wherein the hydrocarbon is a hydrocarbon fluid.

8. The method of claim 1, wherein the hydrocarbon is a hydrocarbon gas.

9. The method of claim 1, wherein the short-chain amine oxide is introduced into the hydrocarbon.

10. The method of claim 9, wherein the short-chain amine oxide is present in the hydrocarbon in a concentration of between about 0.01 weight volume % and about 60 weight volume % of the hydrocarbon.

11. The method of claim 9, wherein the short-chain amine oxide is introduced into the hydrocarbon in an amount to provide a mole ratio of short-chain amine oxide to hydrogen sulfide in the vessel from about 1.0 mole short-chain amine oxide:1.0 mole hydrogen sulfide to about 3.0 moles short-chain amine oxide:1.0 mole hydrogen sulfide.

12. The method of claim 1, wherein the recirculating further comprises heating the hydrocarbon.

13. The method of claim 1, further comprising introducing steam into the vessel.

14. The method of claim 13, wherein the steam comprises 150 psig steam or less.

15. The method of claim 14, further comprising introducing the steam into the vessel to increase the hydrocarbon to a temperature of from about 70° F. to about 150° F.

16. The method of claim 1, wherein the elemental sulfur is separated from the treated hydrocarbon via a centrifuge.

17. The method of claim 1, wherein the hydrocarbon comprises a hydrocarbon fluid layer and a hydrocarbon gas layer.

18. The method of claim 17, wherein the short-chain amine oxide is introduced into the hydrocarbon fluid layer.

19. The method of claim 17, wherein the short-chain amine oxide is introduced into the hydrocarbon gas layer.

* * * * *